United States Patent
Amerga et al.

(12)

(10) Patent No.: US 7,593,367 B2
(45) Date of Patent: Sep. 22, 2009

(54) FREQUENCY SCAN FOR CDMA ACQUISITION

(75) Inventors: Messay Amerga, San Diego, CA (US); Vikas Nagpal, San Diego, CA (US); Wen Jing New, San Diego, CA (US); Subramanya P. Rao, Santa Clara, CA (US); Parvathanathan Subrahmanya, Sunnyvale, CA (US); Bhupesh Manoharlal Umatt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 874 days.

(21) Appl. No.: 10/173,209

(22) Filed: Jun. 14, 2002

(65) Prior Publication Data

US 2003/0231605 A1    Dec. 18, 2003

(51) Int. Cl.
*H04Q 7/00* (2006.01)
*H04B 7/216* (2006.01)

(52) U.S. Cl. ..................................... 370/332; 370/335
(58) Field of Classification Search ................ 370/332, 370/335
See application file for complete search history.

(56) References Cited

U.S. PATENT DOCUMENTS

| | | | | |
|---|---|---|---|---|
| 5,966,657 | A * | 10/1999 | Sporre | 455/425 |
| 6,151,502 | A * | 11/2000 | Padovani et al. | 455/442 |
| 6,188,682 | B1 * | 2/2001 | Takagi et al. | 370/342 |
| 6,195,552 | B1 | 2/2001 | Jeong et al. | |
| 6,205,193 | B1 | 3/2001 | Solve et al. | 375/354 |
| 6,205,334 | B1 | 3/2001 | Dent | 455/434 |
| 6,353,645 | B1 * | 3/2002 | Solve et al. | 375/354 |
| 6,490,314 | B1 * | 12/2002 | Khayrallah et al. | 375/132 |
| 6,539,050 | B1 * | 3/2003 | Lee et al. | 375/146 |

(Continued)

FOREIGN PATENT DOCUMENTS

DE    10046575    4/2002

(Continued)

OTHER PUBLICATIONS

Jeong G: "Parallel Frequency And Code Acquisition Based On Walsh-Hadamard Transform In DS-CDMA", VTC 2000-Spring. 2000 IEEE 51$^{st}$, Vehicular Technology Conference Proceedings, Tokyo, Japan, May 15, 2000, vol. 2 of 3, Conf. 51, pp. 1135-1139. XP 000968047.

(Continued)

*Primary Examiner*—Andrew Lee
(74) *Attorney, Agent, or Firm*—Kenneth K. Vu

(57) ABSTRACT

Techniques for reducing the time required for frequency scan in acquisition are disclosed. In one aspect, received power measurements are made at one or more of the possible carrier frequencies and system search is performed on one or more of those frequencies when the power measurement exceeds a threshold. In another aspect, the power is measured at one or more frequencies in a band of frequencies surrounding a frequency at which the measured power exceeded a threshold. If the measured power at one or more of the frequencies in the band exceeds a second threshold, a system search is performed at one or more of those frequencies. In yet another aspect, frequencies meeting certain criteria are sorted in order of measured power prior to system search or further power measurement, and subsequent processing is performed in order of descending measured power. Various other aspects are also presented. These aspects have the benefit of reducing acquisition time, which results in faster system access and allows for more efficient use of system resources.

25 Claims, 8 Drawing Sheets

U.S. PATENT DOCUMENTS

| | | | |
|---|---|---|---|
| 6,633,556 B1 * | 10/2003 | Sato | 370/332 |
| 6,768,768 B2 | 7/2004 | Rao et al. | |
| 6,801,758 B2 * | 10/2004 | Nagata | 455/101 |
| 6,944,460 B2 * | 9/2005 | Haartsen | 455/452.2 |
| 2001/0043641 A1 | 11/2001 | Harms et al. | 375/130 |
| 2002/0041580 A1 * | 4/2002 | Shoji et al. | 370/335 |
| 2002/0075833 A1 * | 6/2002 | Dick et al. | 370/336 |
| 2002/0102941 A1 * | 8/2002 | Kuiri et al. | 455/63 |
| 2002/0114295 A1 * | 8/2002 | Takahiro et al. | 370/329 |
| 2003/0054829 A1 * | 3/2003 | Moisio | 455/452 |
| 2003/0147365 A1 | 8/2003 | Terasawa et al. | |
| 2004/0157609 A1 * | 8/2004 | Jalloul et al. | 455/442 |

FOREIGN PATENT DOCUMENTS

| | | |
|---|---|---|
| EP | 1056303 A2 | 11/2000 |
| JP | 2000-201101 | 7/2000 |
| JP | 2002-159042 | 5/2002 |
| JP | 2003-60551 | 2/2003 |
| JP | 2003-348648 | 12/2003 |
| WO | WO 00/44117 | 7/2000 |

OTHER PUBLICATIONS

Wang, Yi Pin E et al: "Initial Frequency Acquisition In W-CDMA", Vehicular Technology Conference, 1999. IEEE VTS $50^{th}$ Amsterdam, Netherlands, Sep. 19, 1999, pp. 1013-1017, XP010353116.

International Search Report-PCT/US03/018212, International Search Authority-European Patent Office-Oct. 10, 2003.

* cited by examiner

FREQUENCY SCAN FOR CDMA ACQUISITION

FIELD

The present invention relates generally to communications, and more specifically to a novel and improved method and apparatus for frequency scan for CDMA acquisition.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

Wireless communication systems typically include a plurality of base stations. In CDMA systems, the base stations are differentiated by their scrambling code. In addition, base stations within a system may communicate on one or more frequencies. Neighboring systems often utilize different frequencies as well. Periodically, a mobile station needs to acquire a system, such as upon power-up or when traveling near the edge of an already acquired system. System acquisition begins with locating one or more frequencies used by a system. Subsequently, the scrambling code and its phase must be identified in order to communicate with any particular base station. Systems based on IS-95 and its progeny use a common scrambling code. The base stations are differentiated by a unique offset in the common scrambling code. Systems such as W-CDMA differentiate base stations with unique scrambling codes. Various searching techniques are known in the art for acquiring base stations at a given frequency. Acquisition time is a function of the time required to locate the frequency of a system as well as the time required to search and acquire the scrambling code of a base station on that system.

It is desirable for a mobile station to acquire base stations as rapidly as possible. Upon initial acquisition, users appreciate quick response time, so the acquisition time should be minimized. Furthermore, prompt acquisition of neighbor base stations allows the mobile station to communicate with the optimal set of base stations available. A mobile station communicating with the best set of base stations minimizes required transmit power for a given communication performance level, which results in system resources being allocated efficiently. This results in maximization of system capacity, as well as power reduction in the mobile station. Reduced power in the mobile station translates to extended communication and standby times for a given battery configuration, or reduced battery requirements (size, weight and cost), or both. Minimizing system acquisition time facilitates realizing these benefits. Minimizing the time required to scan potential system frequencies can reduce system acquisition time. There is therefore a need in the art for reducing the time required for frequency scan in acquisition.

SUMMARY

Embodiments disclosed herein address the need in the art for reducing the time required for frequency scan in acquisition. In one aspect, received power measurements are made at one or more of the possible carrier frequencies and system search is performed on one or more of those frequencies when the power measurement exceeds a threshold. In another aspect, the power is measured at one or more frequencies in a band of frequencies surrounding a frequency at which the measured power exceeded a threshold. If the measured power at one or more of the frequencies in the band exceeds a second threshold, a system search is performed at one or more of those frequencies. In yet another aspect, frequencies meeting certain criteria are sorted in order of measured power prior to system search or further power measurement, and subsequent processing is performed in order of descending measured power. Various other aspects are also presented. These aspects have the benefit of reducing acquisition time, which results in faster system access and allows for more efficient use of system resources.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
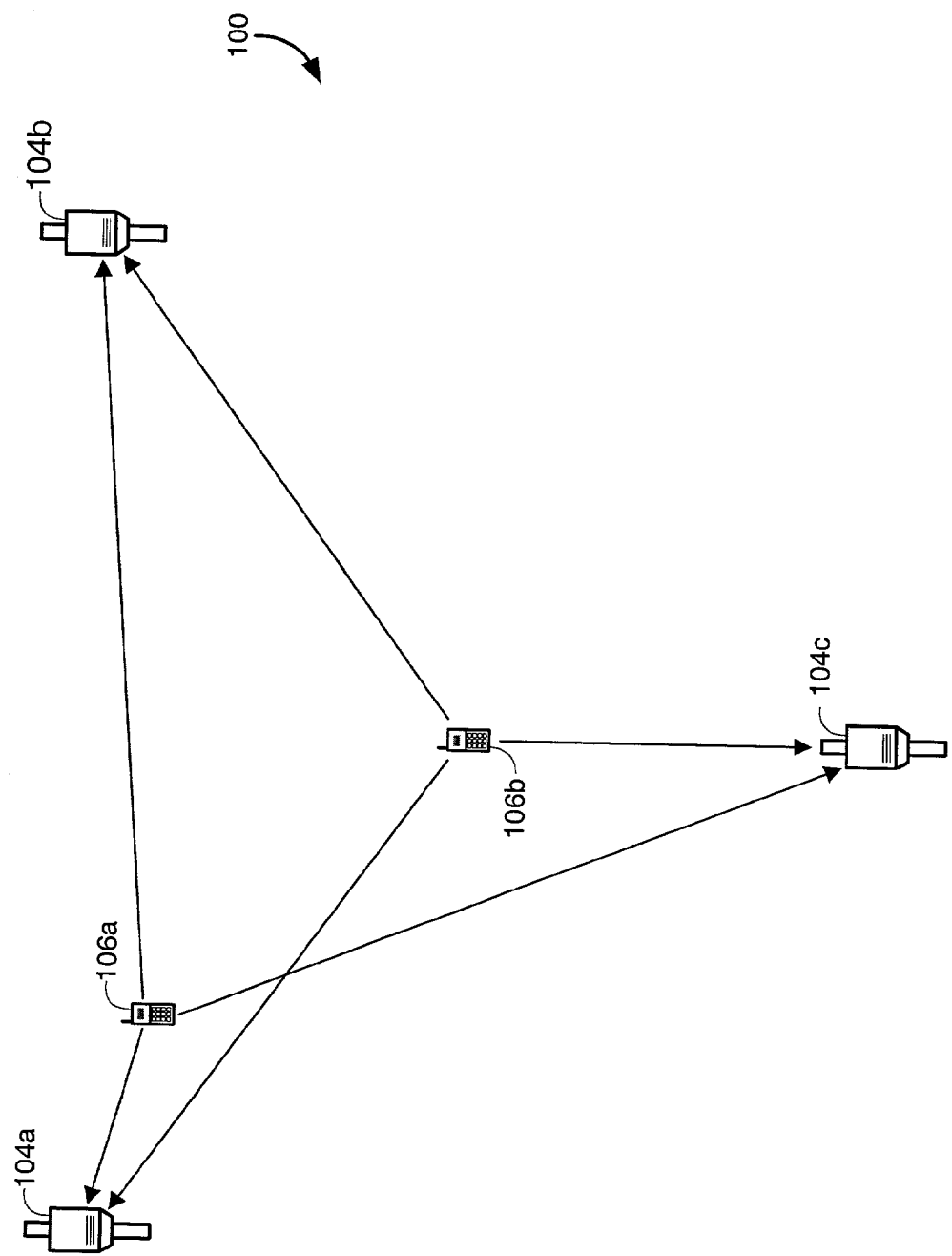
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
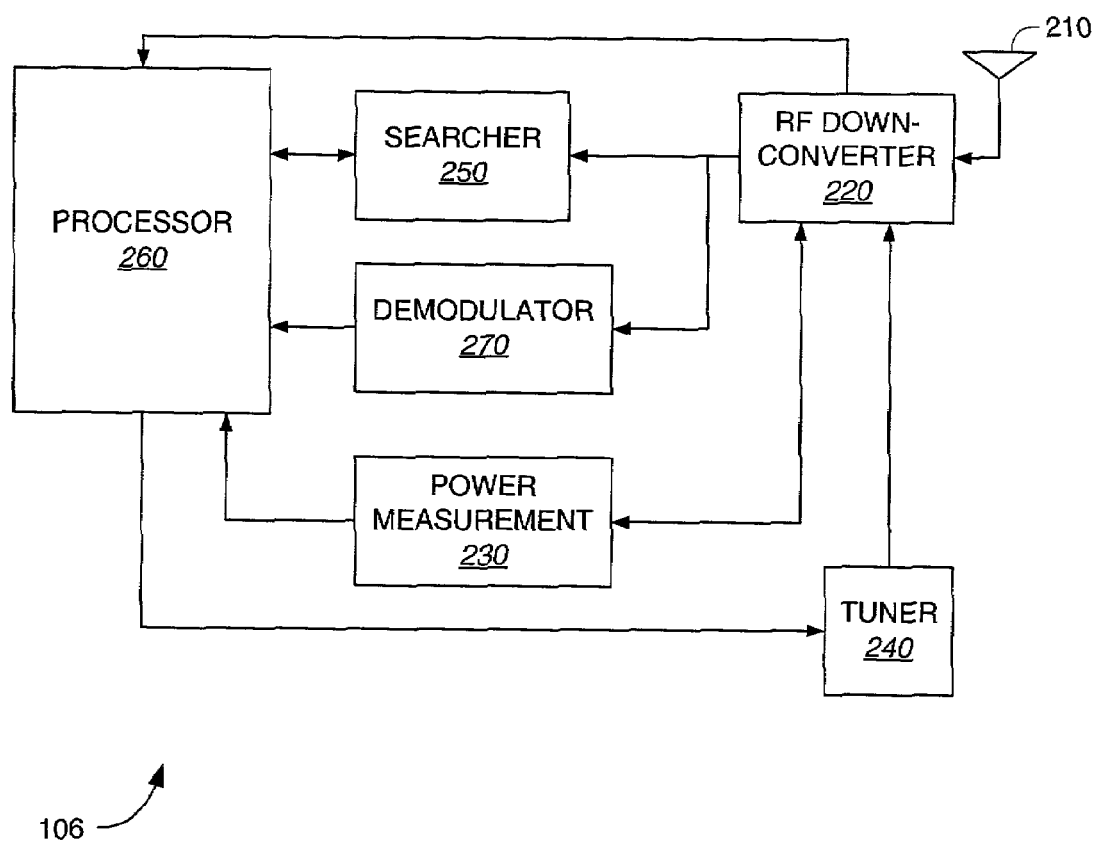
FIG. 2 depicts an exemplary embodiment of a mobile station.

FIG. 2 depicts a portion of a mobile station 106. Signals are received at antenna 210 and delivered to Radio Frequency (RF) downconverter 220. RF downconverter 220 performs processing according to one or more wireless system standards, such as the cellular standards listed above. RF downconverter 220, in converting the received signal to baseband, performs various processing such as amplification, analog to digital conversion, filtering, and the like. Various techniques for RF to baseband conversion are known in the art.

Power measurement block 230 is connected to RF downconverter 220. In some embodiments, power measurement block 230 may be part of RF downconverter 220, but is shown separately for clarity of discussion. Power measurement block 230, a power measurer, provides a measurement of the received power, measured at the currently tuned frequency, to processor 260. In one embodiment, an Automatic Gain Control (AGC) block is deployed to provide a power measurement, among other functions, and the power measurement can be the Received Signal Strength Indicator (RSSI) generated by the AGC.

Tuner 240 connects to RF to Baseband 220 (and may be part of it in some embodiments) to tune the mobile station to a particular frequency, as directed by processor 260.

Searcher 250 receives samples from RF downconverter 220. Searcher 250 can be configured to detect scrambling codes and/or offsets in the baseband signals. Some systems, such as IS-95 and cdma2000 systems, use a common scrambling code for all the base stations, with a unique offset in the code for each base station used to differentiate them. Other systems, such as W-CDMA systems, use unique scrambling codes to differentiate the various base stations. Searcher 230 may comprise a single searcher, or a plurality of search elements, or a single element shared for producing a plurality of search results. Various searcher techniques for a variety of communication systems, including those referenced above, are known in the art. The search results are delivered to processor 260.

Demodulator 270 receives samples from RF downconverter 220 and produces data, delivered to processor 260. As used herein, demodulator 270 is a general term incorporating a variety of components and functions, examples include a RAKE receiver, combiner, deinterleaver, decoders (Viterbi, turbo, block decoders such as BCH, etc.), and others. Some or all of these functions may also be carried out in processor 260, or another processor such as a Digital Signal Processor (DSP) or other general or special purpose processor. Techniques for receiving CDMA samples and demodulating/decoding to produce data symbols are known in the art, and fall within the scope of the present invention. Those of skill in the art will recognize myriad combinations of these and other components that can be deployed without deviating from the principles of the invention disclosed herein.

In alternate embodiments, processor 260 may be a Digital Signal Processor (DSP) or any general-purpose processor. Those of skill in the art will recognize that the methods and functions described herein with respect to processor 260 can also be performed using special purpose hardware, co-processors, a combination of processors or DSPs, or a combination of all of the above. Some or all of the functions attributed to various other blocks described may also be carried out in processor 260. Processor 260 will commonly contain, or be connected with, one or more memory elements for storing instructions to carry out the various tasks and processes described herein as well as data storage (memory not shown).

In the various embodiments described herein, the components of mobile station 106 can be deployed to perform one or more of a variety of general functions. Tuner 240 can be directed to tune to a particular carrier frequency by processor 260. While tuned to a particular frequency, a power measurement can be made by power measurement block 230 and delivered to processor 260. Searcher 250 can be directed to determine if a base station's transmission can be detected, which scrambling code is used, and at what offset. Demodulator 270 can be deployed to receive one or more of a variety of signals, channels, or data from a system, and to indicate whether data is received in error. As described above, decoding may also be carried out in processor 260. Processor 260 or demodulator 270 may be configured to produce an error rate (bit, symbol, block, etc.) for one or more base stations at the tuned carrier frequency. Use of these functions, and combinations thereof, are described more fully below.

Figure 3:
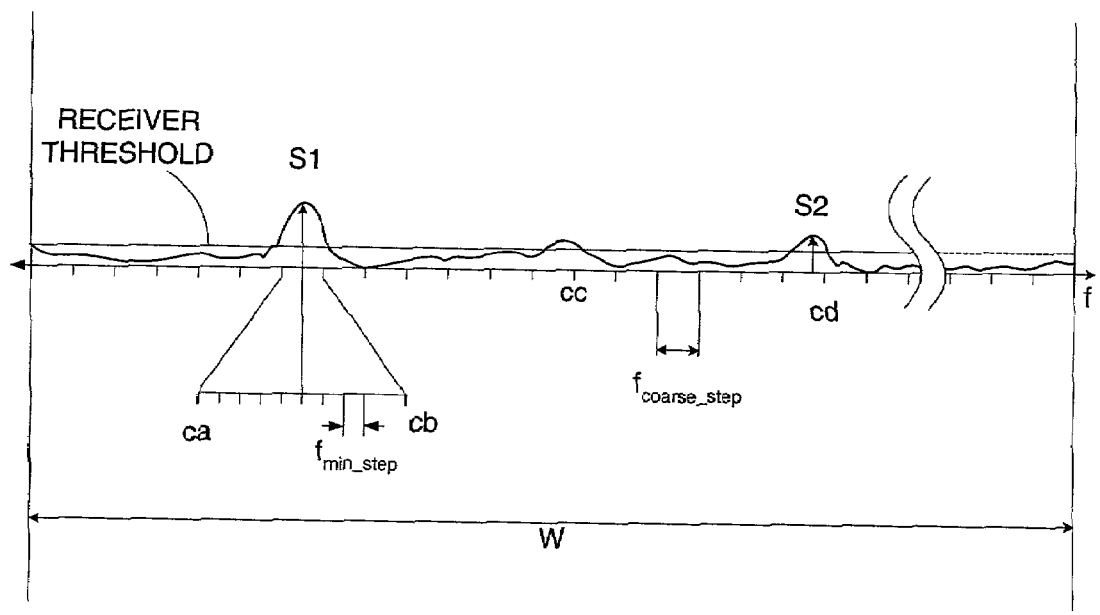
FIG. 3 depicts the conceptual relationship between signal strength and frequency within the bandwidth over which a frequency scan can be performed.

FIG. 3 depicts the conceptual relationship between signal strength and frequency within the bandwidth over which a frequency scan will be performed. The frequency space, W, is shown contiguous, but noncontiguous frequency spaces are also supported. The frequency space is divided into the total number, N, of possible carrier frequencies, where the minimum spacing between possible carrier frequencies is given by $f_{min\_step}$. N is equal to $W/f_{min\_step}$, and in the exemplary embodiment, N=60 MHz/200 kHz=300. In the example shown in FIG. 3, there are two systems, with center frequencies labeled S1 and S2. A horizontal receiver threshold line is drawn that shows S1 and S2, as well as a false positive, which has sufficient energy to exceed the threshold. A false positive is a frequency at which sufficient power is received that the threshold is exceeded, but that does not have a system transmitting at that frequency. Note also that a subset of the N frequencies can be selected, referred to as coarse frequencies, that are spaced apart in frequency by $f_{coarse\_step}$. Note that for each system represented, S1 and S2, at least one coarse frequency exists with sufficient power in the vicinity of the center point of that system. The importance of this will be described with respect to option 4 below. In the embodiments described below, various settings for a power threshold will be contemplated, as well as using more than one threshold, depending on the circumstances.

Described below are four options for performing frequency scan. Various alternatives and combinations are described, and others will be readily apparent to those of skill in the art. Following these descriptions is a comparison of the performance of the various options under some exemplary conditions.

Option 1: Full Search of All Frequencies

As used herein, a full search is defined as the process of locating one or more systems at a particular frequency, by searching and locating the code and/or offset of one or more base stations in the system or systems. Unless otherwise noted, a successful full search includes the successful decoding of one or messages or signals from a system once it has been located at a particular frequency. Search techniques for the above referenced communication systems are known in the art, and future communication systems are anticipated that will have search procedures associated with them. In the exemplary W-CDMA embodiment, full search entails steps 1, 2, and 3 searching, and subsequent BCH decoding of a channel or channels transmitted from a base station. In some instances, described below, a full search will indicate the presence of a system at a particular carrier frequency, but the received signal strength for that system may not be sufficient for successful communication (as indicated by failed BCH decoding, for example). Options for dealing with these situations are detailed further below.

In the exemplary embodiment, W-CDMA searching can be carried out using a three-step procedure. In step one, the mobile station searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two, the mobile station searches for the secondary synchronization codes (SSCs), which make up the secondary synchronization channel. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a mobile station determines the sequence of SSCs transmitted in any 15 consecutive slots, it can determine both the frame timing and which of the 64 SSC sequences was transmitted, thus identifying the scrambling code group in which the base station belongs. Since there are eight codes in each scrambling code group, the number of candidates has been reduced to eight.

In step three, the eight scrambling code candidates identified in step two must be searched to determine which one is the correct code. This can be carried out by performing a chip-by-chip correlation, accumulating energies over some number of chips until a decision can be made. Upon successfully locating the code and its offset, the W-CDMA search is complete.

W-CDMA searching is described in further detail in co-pending U.S. patent application Ser. No. 09/957,377, entitled "METHOD & APPARATUS FOR STEP TWO W-CDMA SEARCHING", filed Sep. 19, 2001, and co-pending U.S. patent application Ser. No. 10/160,874, entitled "STEPS ONE AND THREE W-CDMA AND MULTI-MODE SEARCHING", filed May 21, 2002, both assigned to the assignee of the present invention.

Figure 4:
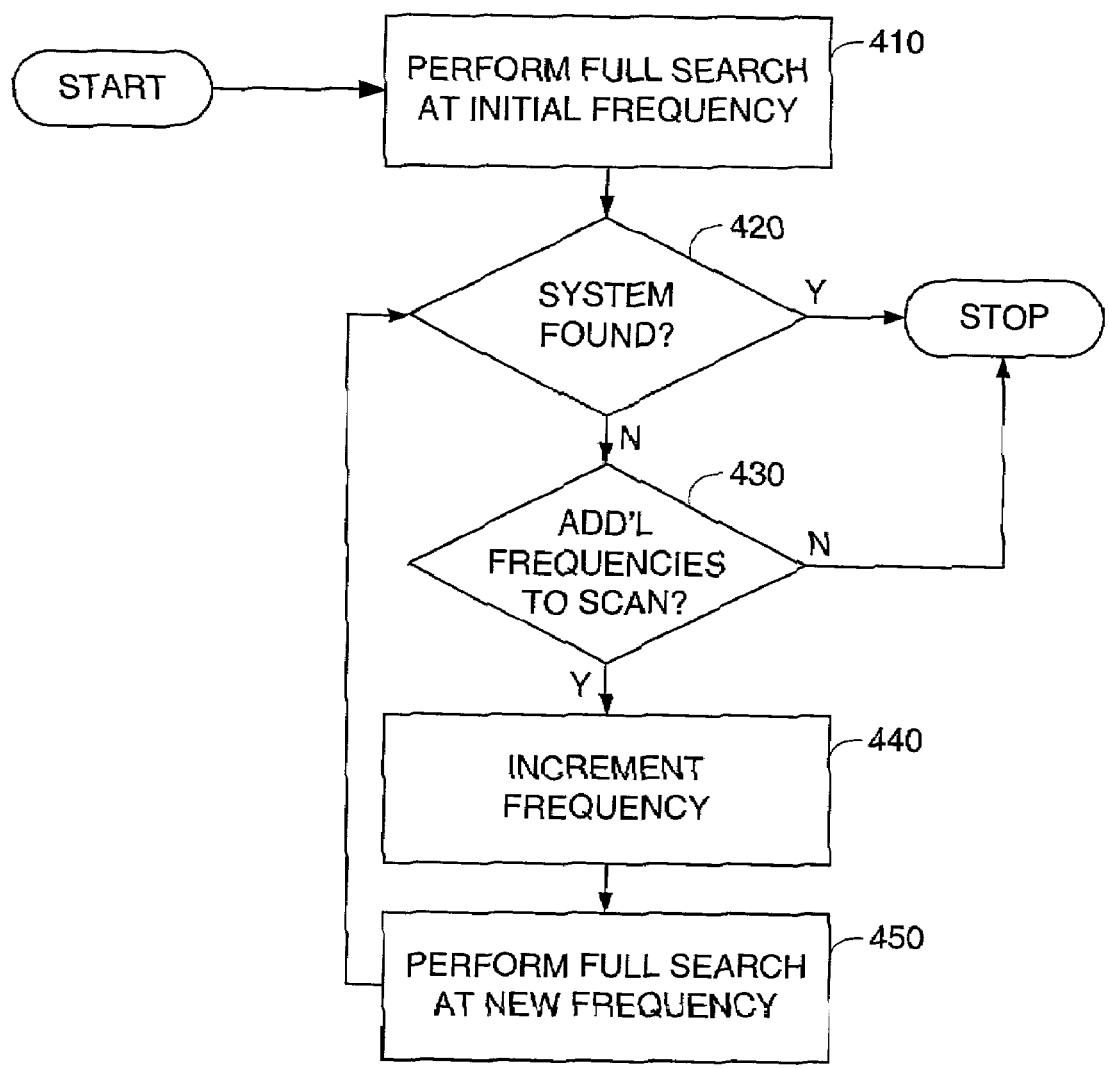
FIG. 4 depicts a flowchart of an embodiment of a method for frequency scan using a full search of all frequencies.

FIG. 4 depicts a flowchart of an embodiment of a method for frequency scan using a full search of all frequencies. The N possible carrier frequencies of the total frequency space W are searched sequentially. Note that the frequency space W need not be contiguous. The process starts in step 410, where a full search is performed at the initial frequency. In the exemplary embodiment, tuner 240 can be used to direct the mobile station 106 to tune to any particular carrier frequency. The full search can be carried out in searcher 250, with subsequent decoding in demodulator 270 or processor 260, as described above. Proceed to decision block 420. In decision block 420, if a system is found, acquisition is successful and the process can stop. In some systems, the existence or location of neighboring systems can be communicated to the mobile station from the located system, once acquisition is complete. Thus, additional frequency scan may be unnecessary. In an alternative embodiment, additional frequencies can also be searched. Those of skill in the art will readily adapt this flowchart to such a case.

If, in decision block 420, a system is not found, proceed to decision block 430. If there are no additional frequencies to scan, the process can stop. In the exemplary embodiment, this indicates a failure to locate a system. In an alternate embodiment, where the search continues after locating a system, a system may have been located earlier. If there are additional frequencies to scan, proceed to step 440.

In step 440, increment the frequency. In this discussion, the frequencies are searched sequentially from the lowest to highest frequency, and incrementing the frequency indicates proceeding to the next frequency spaced $f_{min\_step}$ from the current frequency. Naturally, the frequency space W can be searched in any order. An alternate example would be to produce a list of the frequencies to search, and incrementing the frequency would entail tuning to the next frequency in the list. Proceed to step 450. In step 450, perform a full search at the new frequency. Then return to decision block 420 to determine if a system is found at the new frequency. The loop formed by steps 420-450 can be repeated until no additional frequencies remain to be searched, or a system is found at one of them, as described above.

Option 1, just described, is very likely to locate any available system. In the worst case scenario, where no system is available, a full search will have been performed at every possible frequency. Using W-CDMA as an example, up to 300 frequencies, and hence 300 full searches, will have been performed. One drawback of using option 1 is that a time-consuming full search may be made on many frequencies at which a system is not found. For example, referring to FIG. 3, in the worst case all 300 frequencies will have the maximum amount of search time spent on them. Many of these full searches can be avoided if information about the unlikelihood of detection at those frequencies is available.

Option 2: Micro Search Prior to Full Search

As used herein, a micro search is defined as a measurement of carrier power at a single carrier frequency. As described above, a power measurement can be made using a power measurement block 230. Any component in a mobile station that provides a received power measurement can be utilized to perform a micro search. For example, an AGC may make a received signal strength indicator (RSSI) measurement for the purpose of performing gain control, and that RSSI measurement can also be used in a micro search. In general, the benefits ascribed to embodiments employing micro search, described herein, apply when micro search can be carried out at a particular frequency in less time than a full search would take. Such is the case in the exemplary embodiment, using W-CDMA, as well as the other communication systems referenced above.

Figure 5:
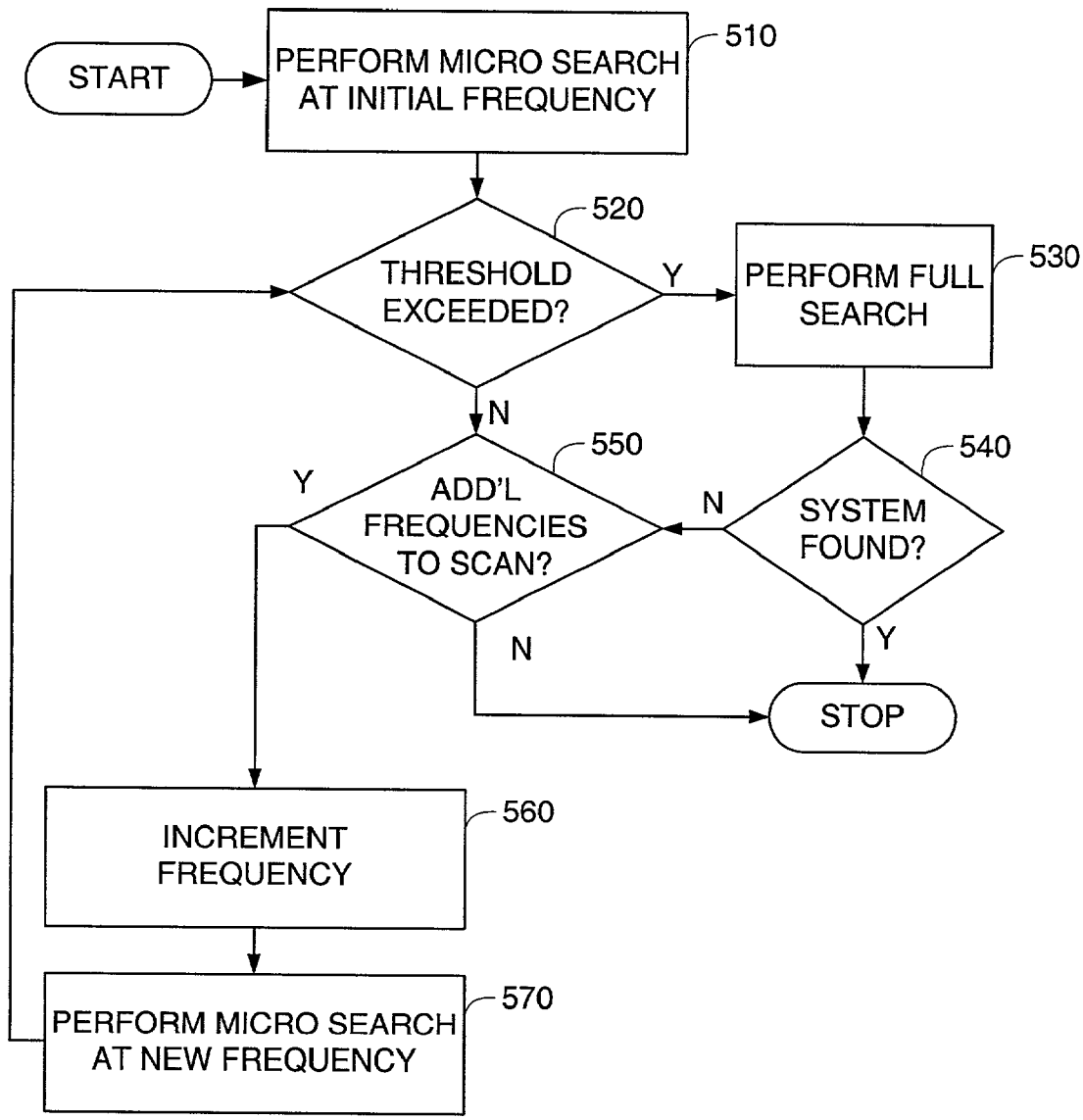
FIG. 5 depicts a flowchart of an embodiment of a method for frequency scan using a micro search of all frequencies.

FIG. 5 depicts a flowchart of an embodiment of a method for frequency scan using a micro search of all frequencies. The N possible carrier frequencies of the total frequency space W are micro searched sequentially, with a full search performed only when certain criteria are met. Various alternatives discussed with respect to option 1 also apply to option 2, where appropriate.

The process starts in step 510, where a micro search is performed at an initial frequency. Various options for the search order of the frequency space can be deployed in alternate embodiments, as described above with respect to option 1. For the sake of discussion, the exemplary embodiment will begin at the lowest frequency and increment to the next highest frequency, $f_{min\_step}$ above. Proceed to decision block 520.

In decision block 520, if the power measured in the micro search exceeds a threshold, proceed to step 530 to perform a full search at the current frequency. If the threshold is not exceeded, a decision is made that a system is not present at the frequency. Proceed to decision block 550 to continue scanning. The threshold can be set at various levels to achieve the results desired. If the threshold is set relatively low, the probability of detecting a false positive will increase. If it is set too high, the existence of a system may be overlooked. Those of skill in the art will recognize how to set the threshold to detect systems likely to be of sufficient received power for satisfactory communication, while reducing time spent on false positives.

After performing a full search in step 530, proceed to decision block 540. If a system is found, the process can stop. As described above, additional system locations can be transmitted to the mobile station once communication with the located system is set up. Alternatively, additional systems can be scanned. If a system is not found proceed to decision block 550.

In decision block 550, if no additional frequencies remain to be scanned, the process can stop. This may indicate that no system was located (in alternate embodiments where scanning continues after a system location, one or more systems may have already been located). If additional frequencies remain to be scanned, proceed to step 560. Increment the frequency to the next desired hypothesis, and proceed to step 570 to perform a micro search at the new frequency. Then return to decision block 520 to continue the loop. The loop formed by steps 520-570 can be repeated until no additional frequencies remain to be searched, or a system is found at one of them, as described above.

Option 2 may provide a faster scan than option 1, since many frequencies will not exceed the threshold and thus the time-consuming full search can be avoided for those frequencies. For example, referring to FIG. 3, only the range of frequencies at which the power exceeds the horizontal threshold line will need to be full searched. In the idealized example shown, only one false positive range of frequencies would be full searched. If the threshold is set appropriately, the probability of missing a system can be made arbitrarily low. In the worst case scenario, in which no system is available, a micro search, which is shorter than a full search, will have been made at all the possible frequencies. However, since frequencies are scanned sequentially, a full search may be performed at a frequency where the threshold is exceeded, although a subsequent micro search may locate a more likely candidate, which, under certain circumstances, can make full search at the first frequency unnecessary. The number of full searches required can be reduced if micro search information at other frequencies is known prior to committing to a full search.

Option 3: Prioritized List of Micro Search Results

Figure 6:
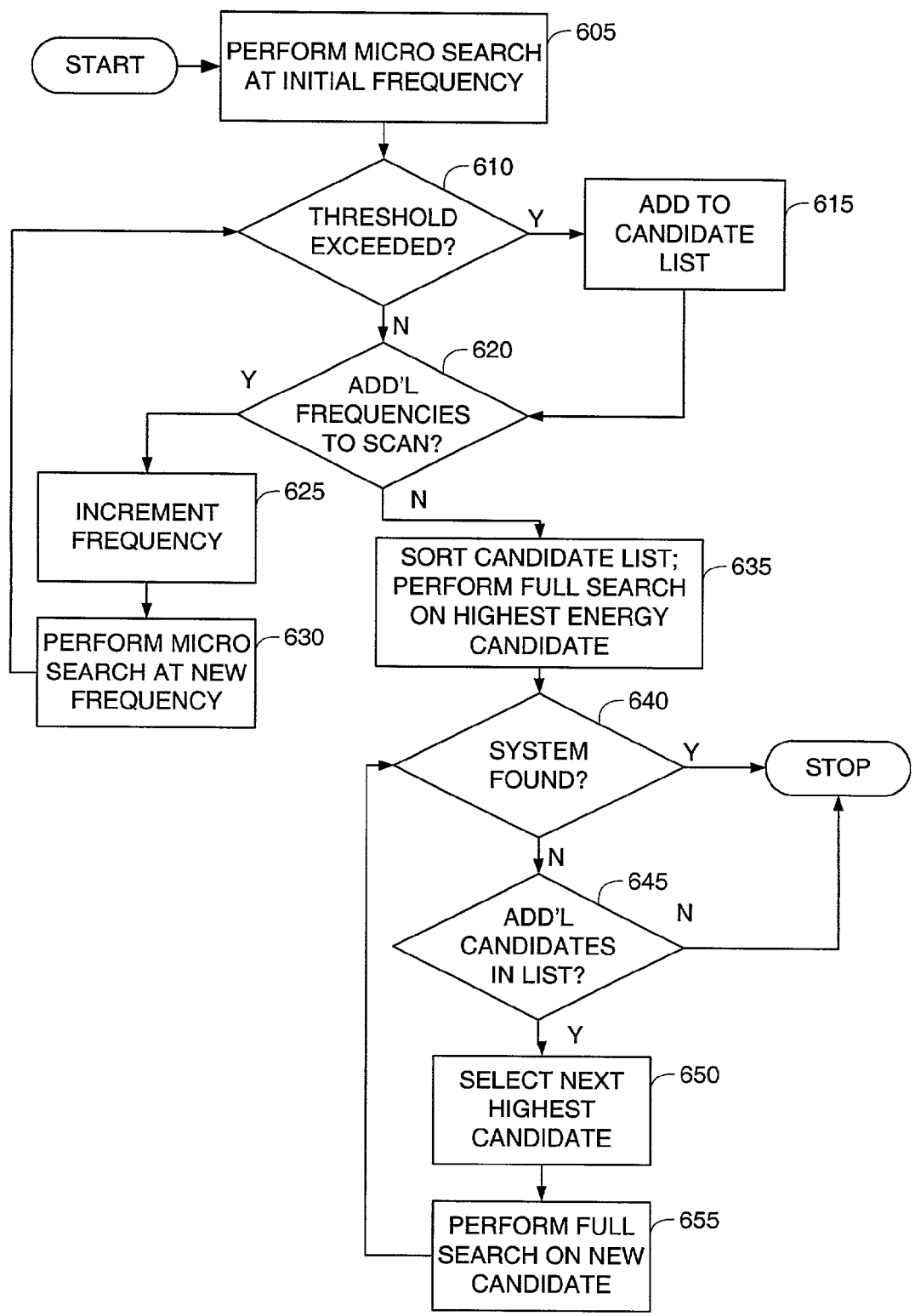
FIG. 6 depicts a flowchart of an embodiment of a method for frequency scan using a micro search of all frequencies, followed by a full search on the most likely candidates.

FIG. 6 depicts a flowchart of an embodiment of a method for frequency scan using a micro search of all frequencies, followed by a full search on the most likely candidates. The N possible carrier frequencies of the total frequency space W are micro searched sequentially, and, when certain criteria are met, the carrier frequency candidate is added to a list sorted by received power. Full search can then be performed on one or more of the highest power candidates in the list. In certain circumstances, this option can avoid full search on candidates which, although they exceed the threshold, are not priority candidates given the presence of other, more likely, candidates. Various alternatives discussed with respect to options 1 and 2 also apply to option 3, where appropriate.

The process starts in step 605, where a micro search is performed at the initial frequency. Proceed to decision block 610 to determine if the received power at the candidate frequency exceeds a threshold. If so, proceed to step 615 and add the candidate with its associated power to a candidate list, sorted in order of descending power. If, in decision block 610, the threshold was not exceeded, or, in step 615, the candidate was added to the candidate list, proceed to decision block 620 to determine if additional frequencies remain to be scanned. If so, proceed to step 625 to increment the candidate frequency. Then proceed to step 630 to perform a micro search at the new frequency. The loop formed by steps 610-630 can be repeated until all the frequencies have been micro searched. Then, when no frequencies remain in decision block 620, proceed to step 635.

Note that alternate embodiments are anticipated where the loop formed by steps 610-630 is terminated prior to performing micro search at all frequencies. For example, if the candidate list grows to a certain length, it may be desirable to attempt to locate a system among those candidates immediately before spending more time on micro searching. Or, if a desired number of candidates in the list exceed a higher threshold, indicating a likelihood of success with a full search, the loop can be terminated early. If the latter portion of this process, described below, proves to be unsuccessful, the loop can be rejoined to continue micro searching for new candidates. These, and myriad other combinations, will be readily adapted by those of skill in the art in light of the teaching herein. Details of these options are not shown in FIG. 6.

Returning to the flowchart, in step 635, a full search is performed on the highest energy candidate in the list. Proceed to decision block 640. If a system is located at the candidate frequency, the process can stop (or additional frequencies can be scanned, as described above in options 1 and 2). If no system is located, proceed to decision block 645. If no additional candidates remain in the candidate list, the process can stop. This may indicate that no system is available, unless a system was located previously (in an alternate embodiment in which scanning continues once a system is found). If additional candidates remain in the candidate list, proceed to step 650 to select the next highest energy candidate in the candidate list. Then proceed to step 655 to perform a full search on the new candidate. The loop formed by steps 640-655 can be repeated until no additional frequencies remain to be searched, or a system is found at one of them, as described above.

If one of the alternate embodiments is employed, described above, in which the loop formed by steps 610-625 is terminated prior to micro searching the entire frequency space, the process can return to that loop (for example, to step 625), if no system was located in decision block 640, or if additional scanning is desired subsequent to the location of a system (details not shown in FIG. 6).

Option 3 may provide a faster scan than either options 1 or 2. Option 3 may be faster than option 1 for the same reasons that option 2 may be faster than option 1. Option 3 may be faster than option 2 because fewer full searches may need to be performed to find a system, given that the candidates were searched in order of highest likelihood of success. In the worst case scenario, in which no system is available, option 3 scan time may equal option 2 if full search is performed on every candidate in the candidate list and the threshold for adding to the list in option 3 (step 610) is the same as the threshold for full search in option 2 (step 520). Alternatively, in option 3, a limited number of the most likely candidates may be full searched, and so the time to fail may still be shorter than in option 2. In another alternative, a higher threshold for full search of the candidates in the candidate list may be determined based on the energies of those candidates (details not shown).

Options 2 and 3 benefit from reducing the number of full searches from the maximum searched in option 1. Option 3 can be configured to reduce the number of full searches further in comparison to option 2. For example, referring to FIG. 3, only a single full search would need to be performed to locate system S1 (although in a more lifelike scenario, noisiness in the received power measurement may result in a few extra full searches being performed). In the exemplary embodiment of option 3, however, a micro search is still performed on every carrier frequency candidate in the frequency space. In alternate embodiments of option 3, the number of micro searches may be reduced if the loop formed by steps 610-630 is terminated early due to a sufficient number of candidates in the candidate list. In either case, the number of micro searches may be reduced if additional information about the system being scanned for is incorporated into the micro search process. One technique is described below as option 4. Additional optimizations can also be made, which are also described below.

Option 4: Reduced Micro Search

Figure 7:
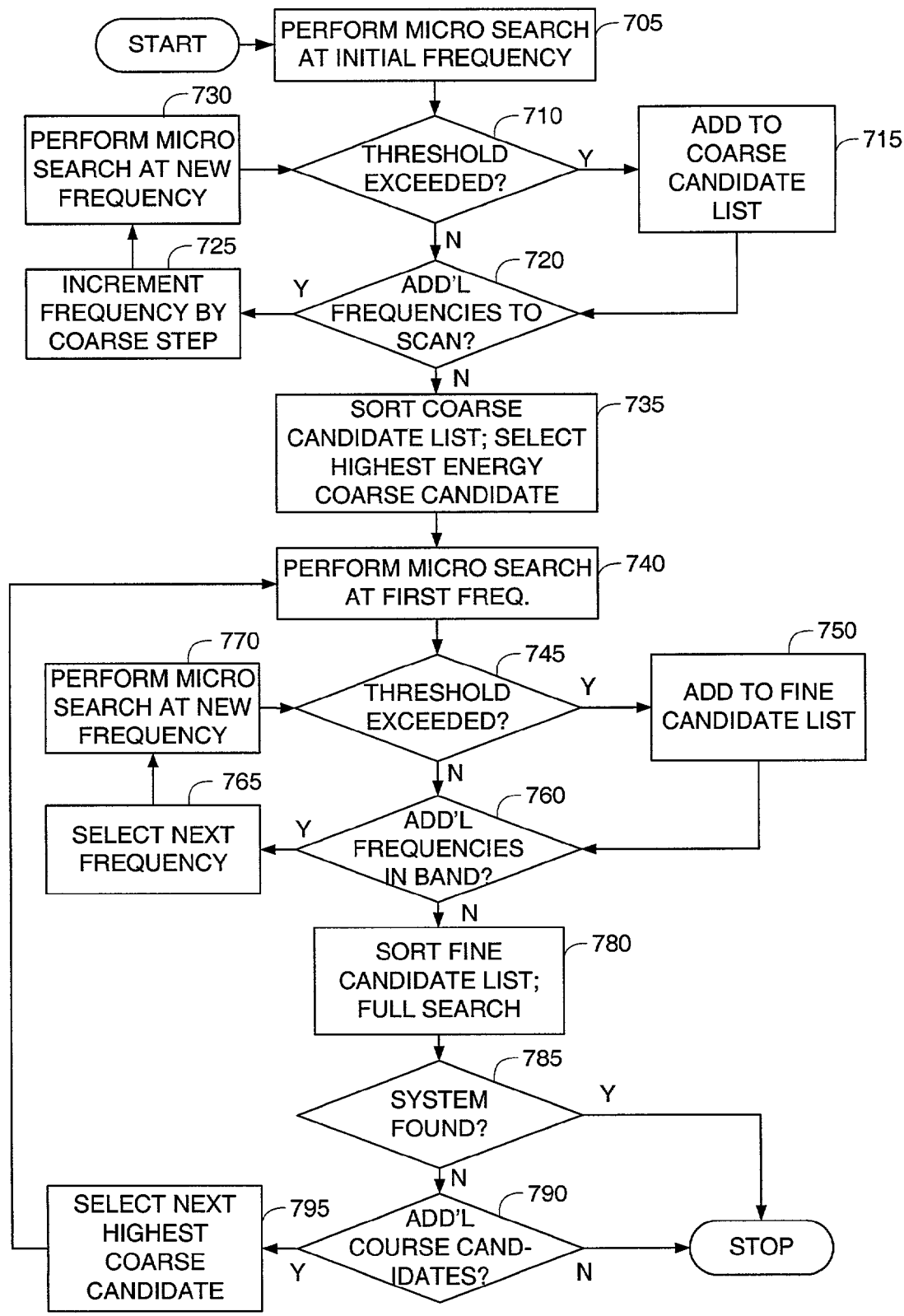
FIG. 7 depicts a flowchart of an embodiment of a method for frequency scan with reduced micro search.

FIG. 7 depicts a flowchart of an embodiment of a method for frequency scan with reduced micro search. In this embodiment, a subset of frequencies is micro searched. The frequencies micro searched are spaced apart by a distance calculated such that the probability of missing a system in between frequencies is sufficiently low. The entire subset of frequencies can be micro searched, with candidates exceeding a threshold being sorted and added to a coarse candidate list, similar to option 3. Or, the subset of frequencies can be micro searched sequentially, with the latter half of the process (described below) carried out on each frequency exceeding a threshold, similar to option 2.

One justification for using option 4 is that significant energy can be picked up away from the center of the signal being searched. For example, the bandwidth of the W-CDMA signal is approximately 5 MHz, so sufficient energy can be picked up 1 to 2 MHz from its center. Therefore, lack of energy at a particular frequency is indicative of absence of a carrier in its vicinity. To compensate for the energy lost due to being off center from the true carrier frequency, the energy threshold required for a candidate frequency to pass the micro search can be reduced. In the exemplary embodiment, the reduction is approximately 3 dB. In the exemplary embodiment, the coarse micro search is performed on 30 frequencies spaced 2 MHz apart.

For example, refer to FIG. 3. It can be seen that only 4 out of the 30 coarse frequencies will have sufficient power to exceed the threshold. In this example only one false positive is included. Note that both systems S1 and S2, while not centered on any coarse frequencies, would be successfully detected. The number of micro searches required will be greatly reduced, since, after scanning 30 coarse frequencies, only 4, ca–cd, would merit further searching.

If the micro search of a subset frequency yields sufficient power, a band of frequencies surrounding the frequency are micro searched. In the exemplary embodiment, the band that is +/−1 MHz around the coarse candidate is searched in steps of 200 KHz. This happens to be increments of $f_{min\_step}$. In alternate embodiments, the principles of this option can be applied recursively. For example, the band surrounding a coarse candidate can be divided into a subset of the band spaced by $f_{fine\_Step}$, where $f_{fine\_step}$ is greater than $f_{min\_step}$. Then a smaller band can be searched around the most likely fine candidates. Any number of passes at various resolutions from coarse to fine can be implemented. Those of skill in the art will recognize how to trade off increased loops or recursions to reduce scan time, and can choose an appropriate configuration for any number of system bandwidths and/or minimum frequency spacings.

The band surrounding a frequency can be searched sequentially, in similar fashion to option 2, or can be sorted and searched in order of highest likelihood of success, in similar fashion to option 3. In either case, those frequencies at which sufficient power was found during micro search can be full searched until a system is found.

In certain circumstances, this option can avoid full search on candidates which, although they exceed the threshold, are not priority candidates given the presence of other, more likely, candidates. In addition, the number of micro searches required can be reduced as well. Various alternatives discussed with respect to options 1, 2 and 3 also apply to option 4, where appropriate.

The process starts in step 705, where a micro search is performed at the initial frequency. Proceed to decision block 710 to determine if the received power at the candidate frequency exceeds a threshold. If so, proceed to step 715 and add the candidate with its associated power to a coarse candidate list, sorted in order of descending power. If, in decision block 710, the threshold was not exceeded, or, in step 715, the candidate was added to the coarse candidate list, proceed to decision block 720 to determine if additional frequencies remain of the subset to be scanned. If so, proceed to step 725 to increment the candidate frequency by $f_{coarse\_step}$. In the exemplary embodiment, $f_{coarse\_step}$ is 2 MHz. Then proceed to step 730 to perform a micro search at the new frequency. The loop formed by steps 710-730 can be repeated until the complete subset of frequencies (30 frequencies in the exemplary embodiment) has been micro searched. Then, when no frequencies remain in decision block 720, proceed to step 735.

Note that alternate embodiments are anticipated where the loop formed by steps 710-730 is terminated prior to performing micro search at all frequencies. For example, if the coarse candidate list grows to a certain length, it may be desirable to attempt to locate a system among those candidates immediately before spending more time on micro searching. Or, if a desired number of candidates in the list exceed a higher threshold, indicating a likelihood of success with a full search, the loop can be terminated early. If the latter portion of this process, described below, proves to be unsuccessful, the loop can be rejoined to continue micro searching for new candidates. These, and myriad other combinations, will be readily adapted by those of skill in the art in light of the teaching herein. Details of these options are not shown in FIG. 7.

Returning to the flowchart, in step 735, the highest energy coarse candidate in the list is selected. Proceed to step 740, where a micro search is performed at the first frequency in the band surrounding the coarse candidate. Proceed to decision block 745. If a threshold is exceeded by the micro search, proceed to step 750 to perform a full search. Note that the threshold used in decision block 745 may be set higher than the threshold in step 710. This is because the first micro search loop (steps 710-730) attempted to identify frequencies that may have a system in their vicinity. The second micro search loop, which searches a band around a coarse frequency, is attempting to locate the actual center point of the system, so the threshold may be set higher. Note also, that, as described above, instead of, or in addition to, raising the threshold in decision block 745, the band can be micro searched and sorted prior to full searching (details of this option not shown in FIG. 7). After full search, proceed to decision block 755 to determine if a system is found. If so, the process can stop (or continue, as described above in options 1-3).

If, in decision block 755, a system is not found, proceed to decision block 760 to determine if additional frequencies remain to be searched around the coarse candidate. If so, proceed to step 765 and select the next frequency. Then proceed to step 770 to perform a micro search at the new frequency. Then return to decision block 745 to determine if the threshold is exceeded. The loop formed by steps 745-770 repeats until the band surrounding the current coarse candidate is completed. Then proceed to decision block 775.

In decision block 775, if there are no additional coarse candidates to scan, the process may stop. As in other options, this may indicate the absence of an available system, unless one or more systems have been located earlier in the process. If there are additional coarse candidates to scan, proceed to step 780 to select the next highest energy coarse candidate. Then return to step 740 to perform a micro search at the first frequency in the band surrounding the new coarse candidate. The loop formed by steps 735-780 can repeat until a system is found or all the coarse candidates in the list have been exhausted.

Thus, option 4, examples of which are described above, and in FIG. 7, can be used to locate a system while reducing the number of full searches and micro searches, and thus the overall scan time can be reduced when compared to options 1-3 in general. (Those of skill in the art will recognize that the characterization of acquisition time for the various options assumes an averaging of an aggregate number of acquisition attempts. In any specific instance, any option may actually yield the lowest acquisition time depending on how it is configured.)

A further optimization can be introduced to any of the options above, if a system is located at a certain frequency. If a system is found, it may be that additional carriers will not be placed within a certain system bandwidth of the system located. Thus, in an alternate embodiment where additional systems are scanned for once one has been located, the frequencies within the system bandwidth can be excluded from micro or full search. In embodiments which stop on first acquisition, there still may be situations where a system is located, but the signal strength is not sufficient for acquisition. For example, full search may fail after step 1, 2, or 3. Or the system may be acquired, but the block error rate is too high and can't be reduced to sustain communication at the desired performance level. In these situations, the subsequent scan can take into consideration the location of the system found.

Figure 8:
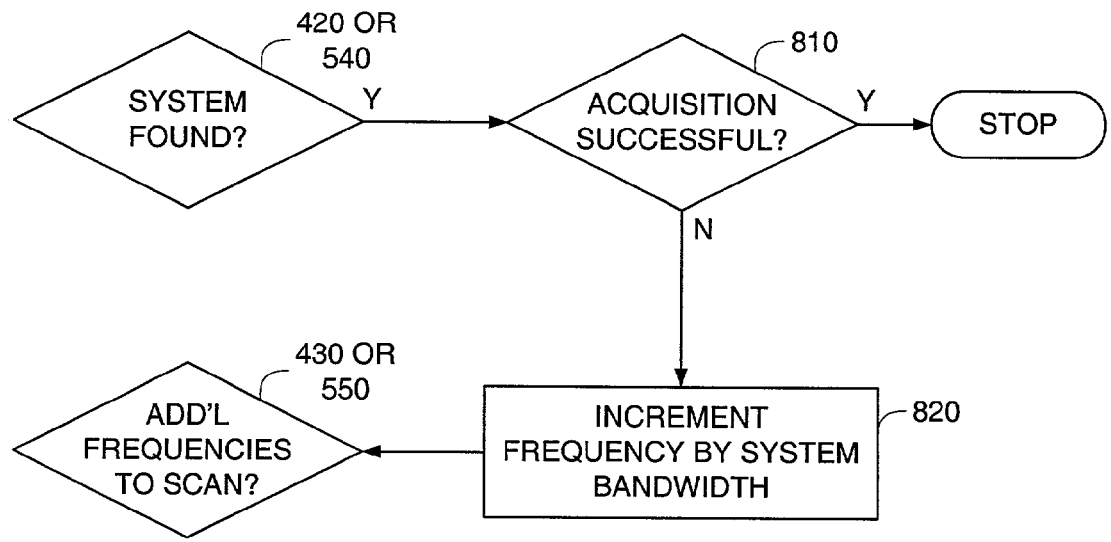
FIG. 8 depicts an exemplary modification that can be introduced to the flowcharts of either FIG. 4 or FIG. 5.

FIG. 8 depicts an exemplary modification that can be introduced to the flowcharts of either FIG. 4 or FIG. 5. From decision block 420 or 540, from FIGS. 4 and 5, respectively, when a system is found, instead of stopping the process, proceed to decision block 810. In decision block 810, if the acquisition is successful, the process can be stopped (or additional systems can be scanned for). If the acquisition is not successful, as determined by any method, including those discussed above, proceed to step 820. In step 820, increment the frequency by the system bandwidth. It is not necessary to full search (in option 1) or micro search (in option 2) frequencies which are within that distance from a located system. Then proceed to decision block 430 or 550, depending on whether option 1 or option 2 is deployed, respectively.

Figure 9:
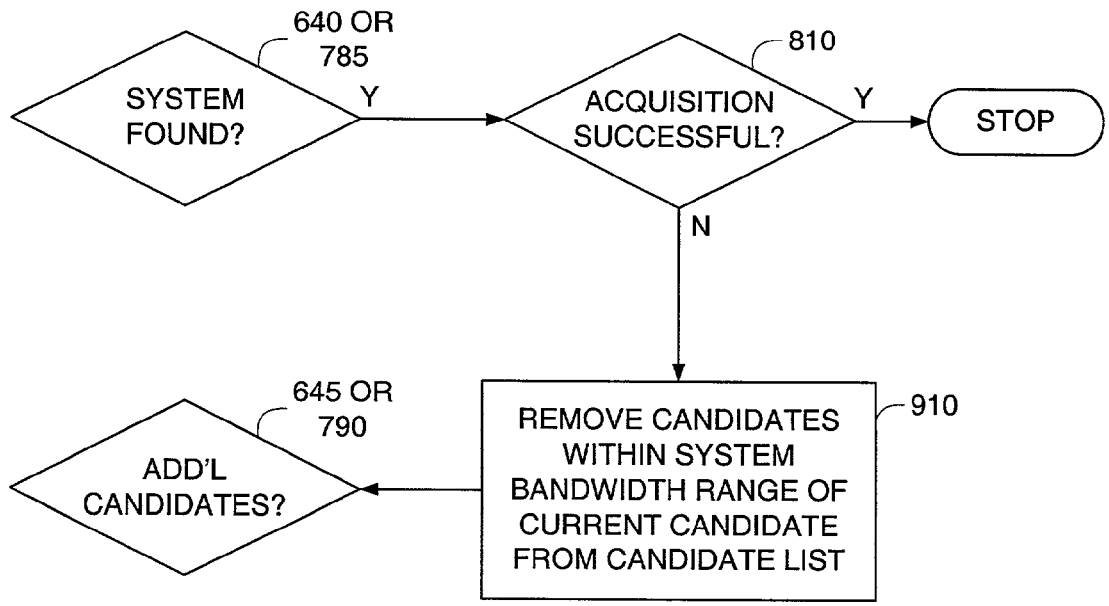
FIG. 9 depicts an exemplary modification that can be introduced to the flowcharts of either FIG. 6 or FIG. 7.

FIG. 9 depicts an exemplary modification that can be introduced to the flowcharts of either FIG. 6 or FIG. 7. From decision block 640 or 755, from FIGS. 6 and 7, respectively, when a system is found, instead of stopping the process, proceed to decision block 810. In decision block 810, if the acquisition is successful, the process can be stopped (or additional systems can be scanned for). If the acquisition is not successful, as determined by any method, including those discussed above, proceed to step 910. In step 910, remove candidates within the system bandwidth range of the current candidate (where a system is located) from the candidate list. The candidates removed may include coarse or fine candidates, and the surrounding range of a coarse candidate, not removed, may be limited if a portion of the surrounding band overlaps with the bandwidth of the located system. It is not necessary to micro search, whether coarse or fine, (in option 3 or option 4) frequencies which are within the bandwidth of a located system. Then proceed to decision block 645 or 775, depending on whether option 3 or option 4 is deployed, respectively.

Table 1 includes an example comparison of the four options described above, using some crude estimates for the sake of discussion. It will be assumed that full search requires 30-200 ms of hardware time to fail depending on the step of the acquisition chain where the failure is detected. If the TCXO error has not been pulled in yet (as would be the case for initial power-up), 3 TCXO hypotheses need to be tried out, so the above search time would triple. For this discussion, denote the full search time F and assign it the nominal value of 100 ms. In this example, micro search requires 2 ms of hardware and firmware time; software delays are in addition. Denote micro search time as M and use 5 ms as a nominal value. The estimates included in table include failure time, the time it takes to fail assuming there is no system available, and single success time, the worst case assuming there is exactly one W-CDMA carrier in the band.

TABLE 1

| | Failure Time | | Single Success Time | |
|---|---|---|---|---|
| OPTIONS | Formula | Time | Formula | Time |
| Option 1 | 300F | 30 s | 300F | 30 s |
| Option 2 | 300M | 1.5 s | 300M + 50F | 6.5 s |
| Option 3 | 300M | 1.5 s | 300M + 25F | 4 s |
| Option 4 | 30M | 0.15 s | 30M + 25 (M + F) | 2.6 s |

Note that the foregoing discussion has used the signals, codes and parameters defined in the W-CDMA standard as some of the exemplary signals, codes and parameters. This is for clarity of discussion only, and should not be construed to limit the scope of the present invention to W-CDMA systems. The principles of the present invention apply to any conceivable system in which a frequency band must be searched in frequency increments, as described above. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a power measurer that measures received power at frequencies of a total number of possible carrier frequencies during a micro search to determine a list of candidate frequencies having the received power above or equal to a threshold; and
   a searcher that searches the candidate frequencies in the list during a full search for a system;
   wherein the searcher attempts during the full search to locate a system at at least one candidate frequency by locating a code and/or offset of a transmitter in the system.

2. The apparatus of claim 1, further comprising a tuner that tunes to the frequencies at which the power measurer measures received power or the candidate frequencies for the searcher to locate a system.

3. The apparatus of claim 2, further comprising:
   a processor that:
      directs the tuner to the frequencies;
      receives power measurements from the power measurer at the frequencies;
      directs the searcher to perform the full search at the candidate frequencies; and
      receives search results therefrom.

4. The apparatus of claim 3, wherein the processor further:
   directs the tuner to tune to a subset of frequencies of the total number of carrier frequencies;
   receives the measured power at one of the subset of the frequencies;
   compares the measured power at each frequency of the subset to the threshold;
   enters those frequencies above or equal to the threshold in the list of candidate frequencies in ranked order; and
   directs the searcher to perform the full search beginning with a candidate frequency with a highest measured power in the list.

5. The apparatus of claim 3, further comprising a demodulator for demodulating data at the frequencies, as determined by the tuner, and for delivering demodulation results to the processor for determination if a located system is sufficient for further communication.

6. The apparatus of claim 3, further comprising a downconverter that downconverts a received signal at the frequency received from the tuner, the downconverted signal being delivered to the power measurer and the searcher to perform power measurements and the full search, respectively.

7. A wireless communication system, including a wireless communication device, comprising:
a power measurer that measures received power at frequencies of a total number of possible carrier frequencies during a micro search to determine a list of candidate frequencies having the received power above or equal to a threshold; and
a searcher that searches the candidate frequencies in the list during a full search for a system;
wherein the searcher attempts during the full search to locate the system at at least one candidate frequency by locating a code and/or offset of at least one transmitter in the system.

8. A method of frequency scan for locating a system, comprising:
measuring power at frequencies in a frequency subspace during a micro search to determine a candidate list of candidate frequencies having the received power above or equal to a first threshold; and
searching, by the searcher, the candidate frequencies during a full search to locate the system wherein the searcher attempts during the full search to locate the system at least one candidate frequency by locating a code and/or offset of a transmitter in the system.

9. The method of claim 8, further comprising performing additional power measurements only at frequencies outside a predetermined bandwidth from a frequency at which the system is located.

10. The method of claim 8, wherein the frequency subspace comprises all the possible carrier frequencies.

11. The method of claim 8, wherein the frequency subspace comprises a subset of the possible carrier frequencies.

12. The method of claim 8, further comprising:
sorting each frequency, at which the measured power exceeds the first threshold, by measured power into the candidate list; and
wherein the searching includes performing the full search on those frequencies in the candidate list in order of decreasing measured power, subsequent to the addition of one or more frequencies to the candidate list.

13. The method of claim 12, wherein the measuring of the power is over the entire frequency subspace prior to performing of the full search on the candidate list.

14. The method of claim 12, wherein:
the measuring of the power is over a subset of the frequencies in the frequency subspace;
the searching is performed on the candidate list generated from the subset of frequencies; and
further comprising:
measuring additional power on one or more of the remaining frequencies if a system is not located on any of the candidate frequencies in the candidate list.

15. The method of claim 8, further comprising:
measuring power at one or more frequencies in a band surrounding a frequency in the frequency subspace at which the measured power exceeds the first threshold; and
wherein the searching is performed on one or more frequencies in the band at which the measured power exceeds a second threshold.

16. An apparatus, comprising:
means for measuring power at frequencies in a frequency subspace during a micro search to determine a list of candidate frequencies having the measured power above or equal to a first threshold; and
means for searching during a full search the candidate frequencies to locate a system;
wherein the searching means attempt during the full search to locate a system at at least one candidate frequency by locating a code and/or offset of a transmitter in the system.

17. The apparatus of claim 16, further comprising:
means for sorting each frequency, at which the measured power exceeds the first threshold, by the measured power into the candidate list; and
wherein the means for searching includes means for searching during the full search the candidate frequencies in the candidate list in order of decreasing measured power, subsequent to the addition of one or more frequencies to the candidate list.

18. The apparatus of claim 17, wherein the means for measuring the power includes means for measuring the power on all frequencies in the frequency subspace prior to the searching on the candidate list.

19. The apparatus of claim 17, wherein the means for measuring the power includes means for measuring the power over a subset of the frequencies in the frequency subspace, and the means for searching includes means for searching during the full search the candidate list generated from the subset of frequencies; and further comprising means for performing additional power measurements on one or more of the remaining frequencies if the system is not located in the candidate list.

20. The apparatus of claim 16, further comprising:
means for measuring power at one or more frequencies in a band surrounding a frequency in the frequency subspace at which the measured power exceeds the first threshold; and
means for searching during the full search on one or more frequencies in the band at which the measured power exceeds a second threshold.

21. A computer program product including computer readable media having instructions for causing a computer to:
measure power at frequencies in a frequency subspace during a micro search to determine a list of candidate frequencies having the measured power above or equal to a first threshold; and
search during a full search the candidate frequencies to locate a system wherein the search attempts during the full search to locate the system at least one candidate frequency by locating a code and/or offset of a transmitter in the system.

22. The product of claim 21, further comprising instructions for causing the computer to:
sort each frequency, at which the measured power exceeds the first threshold, by the measured power into the candidate list; and
wherein the instructions to search include instructions to cause the computer to search during the full search the candidate frequencies in the candidate list in order of decreasing measured power, subsequent to the addition of one or more frequencies to the candidate list.

23. The product of claim 22, wherein the instructions to measure the power include instructions to cause the computer to measure the power on all frequencies in the frequency subspace prior to the search on the candidate list.

24. The product of claim 22, wherein the instructions to measure the power include instructions to cause the computer to measure the power over a subset of the frequencies in the frequency subspace, and the instructions to search the full search include instructions to cause the computer to search during the full search the candidate list generated from the subset of frequencies; and further comprising instructions to cause the computer to perform additional power measurements on one or more of the remaining frequencies if the system is not located in the candidate list.

25. The product of claim 21, further comprising instructions to cause the computer to:
    measure power at one or more frequencies in a band surrounding a frequency in the frequency subspace at which the measured power exceeds the first threshold; and
    search during the full search on one or more frequencies in the band at which the measured power exceeds a second threshold.

* * * * *

UNITED STATES PATENT AND TRADEMARK OFFICE
CERTIFICATE OF CORRECTION

PATENT NO. : 7,593,367 B2  Page 1 of 1
APPLICATION NO. : 10/173209
DATED : September 22, 2009
INVENTOR(S) : Amerga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Twenty-first Day of September, 2010

David J. Kappos
*Director of the United States Patent and Trademark Office*